(12) United States Patent
Jang et al.

(10) Patent No.: US 11,735,790 B2
(45) Date of Patent: Aug. 22, 2023

(54) SECONDARY BATTERY HAVING MULTILAYER BATTERY CASE AND METHOD OF MANUFACTURING THE SAME

(71) Applicant: LG Chem, Ltd., Seoul (KR)

(72) Inventors: Jae Young Jang, Daejeon (KR); Han Saem Park, Daejeon (KR); Jin Hyun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/058,902

(22) PCT Filed: Feb. 17, 2020

(86) PCT No.: PCT/KR2020/002215
§ 371 (c)(1),
(2) Date: Nov. 25, 2020

(87) PCT Pub. No.: WO2020/251134
PCT Pub. Date: Dec. 17, 2020

(65) Prior Publication Data
US 2021/0265687 A1  Aug. 26, 2021

(30) Foreign Application Priority Data

Jun. 10, 2019  (KR) .................... 10-2019-0067867

(51) Int. Cl.
*H01M 50/124* (2021.01)
*H01M 10/643* (2014.01)
(Continued)

(52) U.S. Cl.
CPC ........... *H01M 50/124* (2021.01); *B23K 20/10* (2013.01); *H01M 10/643* (2015.04);
(Continued)

(58) Field of Classification Search
CPC .. B23K 20/10; H01M 10/643; H01M 10/653; H01M 50/107; H01M 50/116;
(Continued)

(56) References Cited

U.S. PATENT DOCUMENTS 5,976,729 A    11/1999  Morshita et al.
6,447,947 B1 *  9/2002  Huq .................... H01M 50/128
                                                      429/176
(Continued)

FOREIGN PATENT DOCUMENTS

CN    1495932 A    5/2004
CN    1790801 A    6/2006
(Continued)

OTHER PUBLICATIONS

Notice of Allowance dated Oct. 27, 2021, issued in corresponding Japanese Patent Application No. 2020-547147. Note: JP 2001-283796 and CN 201498534 cited therein are already of record.
(Continued)

*Primary Examiner* — Lingwen R Zeng
(74) *Attorney, Agent, or Firm* — Morgan, Lewis & Bockius LLP (57) ABSTRACT

A secondary battery includes an electrode assembly having a positive electrode, a negative electrode, a separator interposed therebetween, a positive electrode tab, and a negative electrode tab; a cap assembly having a current interrupt device to interrupt current when pressure increases, a safety vent connected to an upper end of the current interrupt device, and a top cap with an upwardly protruding shape; and a battery case to receive the electrode assembly and the cap assembly therein. The battery case has an inner layer adjacent to the electrode assembly and an outer layer of a material exhibiting lower thermal conductivity than the inner layer. The inner layer and the outer layer having a (Continued)

welding portion, at which only the predetermined regions of the inner layer and the outer layer are fixed.

9 Claims, 7 Drawing Sheets

(51) Int. Cl.
    *H01M 10/653* (2014.01)
    *H01M 50/107* (2021.01)
    *H01M 50/30* (2021.01)
    *H01M 50/147* (2021.01)
    *B23K 20/10* (2006.01)
    *H01M 50/116* (2021.01)

(52) U.S. Cl.
    CPC ....... *H01M 10/653* (2015.04); *H01M 50/107* (2021.01); *H01M 50/147* (2021.01); *H01M 50/30* (2021.01); *H01M 50/116* (2021.01); *Y02E 60/10* (2013.01)

(58) Field of Classification Search
    CPC .. H01M 50/124; H01M 50/147; H01M 50/30; Y02E 60/10
    See application file for complete search history.

(56) References Cited

U.S. PATENT DOCUMENTS

| | | |
|---|---|---|
| 2002/0197529 A1 | 12/2002 | Moriwaki et al. |
| 2004/0121229 A1 | 6/2004 | Kim et al. |
| 2004/0137322 A1 | 7/2004 | Hong et al. |
| 2006/0127777 A1 | 6/2006 | Ihara et al. |
| 2006/0208346 A1 | 9/2006 | Kimura et al. |
| 2007/0196731 A1 | 8/2007 | Hyung et al. |
| 2009/0317707 A1 | 12/2009 | Cha |
| 2010/0009253 A1 | 1/2010 | Mao et al. |
| 2013/0202951 A1 | 8/2013 | Kawai et al. |
| 2014/0242451 A1 | 8/2014 | Sawayama et al. |
| 2017/0170475 A1* | 6/2017 | Niwata .................. C01G 53/44 |
| 2018/0315964 A1 | 11/2018 | Nam et al. |
| 2020/0127244 A1 | 4/2020 | Postler et al. |

FOREIGN PATENT DOCUMENTS

| | | |
|---|---|---|
| CN | 201498534 U | 6/2010 |
| CN | 108987614 A | 12/2018 |
| DE | 102017211112 A1 | 1/2019 |
| EP | 0 798 794 A1 | 10/1997 |
| JP | H09-320565 A | 12/1997 |
| JP | 2000-260419 A | 9/2000 |
| JP | 2001-283796 A | 10/2001 |
| JP | 2004-214175 A | 7/2004 |
| JP | 2006-260983 A | 9/2006 |
| JP | 2007-273258 A | 10/2007 |
| JP | 2012-028490 A | 2/2012 |
| JP | 2012-190779 A | 10/2012 |
| KR | 2004-0058916 A | 7/2004 |
| KR | 10-2007-0082969 A | 8/2007 |
| KR | 10-2009-0095548 A | 9/2009 |
| KR | 10-2009-0132494 A | 12/2009 |
| KR | 10-2014-0106391 A | 9/2014 |
| KR | 10-2015-0130002 A | 11/2015 |
| KR | 10-2018-0120406 A | 11/2018 |
| KR | 10-2018-0127721 A | 11/2018 |

OTHER PUBLICATIONS

Office Action dated Jul. 12, 2022, issued in corresponding Chinese Patent Application No. 202080002282.2. Note: KR 2018-0120406, CN 201498534 and JP 2001-283796 cited therein are already of record.

Office Action issued in corresponding Chinese Patent Application No. 202080002282.2, dated May 6, 2023. Note: US2002197529 and U.S. Pat. No. 6,551,742 cited therein are already of record.

* cited by examiner

SECONDARY BATTERY HAVING MULTILAYER BATTERY CASE AND METHOD OF MANUFACTURING THE SAME

TECHNICAL FIELD

This application claims the benefit of priority to Korean Patent Application No. 2019-0067867 filed on Jun. 10, 2019, the disclosure of which is hereby incorporated by reference herein its entirety.

The present invention relates to a cylindrical secondary battery having a multilayer battery case and a method of manufacturing the same, and more particularly to a cylindrical secondary battery having a multilayer battery case configured such that only a predetermined region of a sheet made of different kinds of metals including a copper material and a nickel material, is ultrasonically welded so as to be used as a sheet for battery cases and such that a negative electrode tab is made of copper, which is the same kind of metal as an inner layer of the battery case, whereby it is possible to secure reliability in welding and to provide a high-output secondary battery, and a method of manufacturing the same.

BACKGROUND ART

As mobile devices have been continuously developed and the demand for mobile devices has increased, secondary batteries, which are capable of being charged and discharged, have been used as energy sources for various mobile devices. In addition, secondary batteries have also attracted considerable attention as energy sources for electric vehicles and hybrid electric vehicles, which have been presented as alternatives to existing gasoline and diesel vehicles using fossil fuels.

Based on the shape of a battery case, secondary batteries are classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet.

The electrode assembly, which is mounted in the battery case, is a power generating element that is configured to have a structure including a positive electrode, a negative electrode, and a separator that is interposed between the positive electrode and the negative electrode and that can be charged and discharged. The electrode assembly is classified as a jelly-roll type electrode assembly, which is configured to have a structure in which a long sheet type positive electrode and a long sheet type negative electrode, to which active materials are applied, are wound in the state in which a separator is disposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are disposed respectively between the positive electrodes and the negative electrodes. The jelly-roll type electrode assembly has advantages in that it is easy to manufacture the jelly-roll type electrode assembly and in that the jelly-roll type electrode assembly has high energy density per weight.

Meanwhile, in such a secondary battery, a negative electrode tab extending from a negative electrode is welded to the lower surface of the inside of a battery case by resistance welding. Resistance welding is generally performed by inserting a first welding rod into a core of an electrode assembly so as to contact the negative electrode tab and applying current to a second welding rod in the state in which the second welding rod is in tight contact with the outer surface of the lower end of the battery case at a position opposite the first welding rod. In the case in which a plurality of conductors contacts each other, heat is generated due to contact resistance, and welding is performed by the heat. A larger amount of heat is generated at the contact portion as contact resistance increases. Contact resistance increases as the contact area between the conductors decreases. The inner surface of the lower end of a battery case of a general cylindrical secondary battery and a negative electrode tab of the secondary battery are smooth and flat, whereby contact resistance is low, and therefore weldability is reduced.

In connection therewith, Patent Document 1 discloses a cylindrical secondary battery configured such that a projecting portion is formed on a lower surface plate of a battery case in order to increase contact resistance when a negative electrode tab comes into contact with the battery case, whereby it is possible to easily weld the negative electrode tab, but has a shortcoming in that the negative electrode tab is deformed by the projecting portion located at the fused surface between the lower surface plate of the battery case and the negative electrode tab, whereby a ripple phenomenon may occur.

In addition, although the negative electrode tab is formed so as to have an embossed structure in order to weld the negative electrode tab, which is made of a metal having low resistance, whereby welding processability is improved, the amount of heat generated when the negative electrode tab made of the low-resistance material is welded to the battery case, which has relatively high resistance, is considerably small, whereby it is not possible to secure processability to a preferred level, and a plurality of secondary batteries having welding defects may be manufactured.

Patent Document 2 discloses a secondary battery including a clad negative electrode tab having a two-layer structure including nickel and copper. Since the clad negative electrode tab having the two-layer structure including nickel and copper has higher resistance than a negative electrode tab made of a copper material, however, the maximum allowable current and heat dissipation characteristics of the clad negative electrode tab are deteriorated, whereby it is not possible to provide a high-output secondary battery.

PRIOR ART DOCUMENT (Patent Document 1) Korean Patent Application Publication No. 2007-0082969

(Patent Document 2) Korean Patent Application Publication No. 2009-0132494

DISCLOSURE

Technical Problem

The present invention has been made in view of the above problems, and it is an object of the present invention to provide a cylindrical secondary battery having excellent allowable current and heat dissipation characteristics, whereby the output of the cylindrical secondary battery may be increased, and a method of manufacturing the same.

It is another object of the present invention to provide a cylindrical secondary battery that does not use an expensive material, such as a copper-nickel clad, whereby production cost of the cylindrical secondary battery may be reduced, and a method of manufacturing the same.

It is a further object of the present invention to provide a cylindrical secondary battery that uses a negative electrode tab and a battery case made of the same kind of metal, whereby resistance welding may be easily performed and the defect rate of products may be reduced, and a method of manufacturing the same.

Technical Solution

A cylindrical secondary battery having a multilayer battery case according to the present invention provided to solve the above problems includes an electrode assembly 100 including a positive electrode 110, a negative electrode 120, a separator 130 interposed between the positive electrode 110 and the negative electrode 120, a positive electrode tab 140 having one side connected to the positive electrode 110, and a negative electrode tab 150 having one side connected to the negative electrode 120; a cap assembly 200 including a current interrupt device 210 configured to interrupt current when pressure in the battery increases, the current interrupt device being located at the upper part of the electrode assembly 100, a safety vent 230 connected to the upper end of the current interrupt device 210, and a top cap 250 formed in an upwardly protruding shape, the lower surface of the outer circumferential surface of the top cap being in contact with the upper surface of the outer circumferential surface of the safety vent 230; and a cylindrical battery case 300 configured to receive the electrode assembly 100 and the cap assembly 200 therein, wherein the cylindrical battery case 300 includes an inner layer 310 disposed adjacent to the electrode assembly 100 and an outer layer 320 made of a material that exhibits lower thermal conductivity than the inner layer 310, the inner layer 310 and the outer layer 320 being provided with a welding portion 330, at which only predetermined regions of the inner layer and the outer layer are fixed by welding.

Also, in the cylindrical secondary battery having the multilayer battery case according to the present invention, the inner layer 310 may be made of copper, and the outer layer 320 may be a nickel or nickel-plated steel sheet.

Also, in the cylindrical secondary battery having the multilayer battery case according to the present invention, the welding portion 330 may be formed by ultrasonic welding.

Also, in the cylindrical secondary battery having the multilayer battery case according to the present invention, the welding portion 330 may be located at the lower surface of the battery case 300.

Also, in the cylindrical secondary battery having the multilayer battery case according to the present invention, the welding portion 330 may be formed in a circular band shape smaller than the inner diameter of the battery case 300.

Also, in the cylindrical secondary battery having the multilayer battery case according to the present invention, the welding portion 330 may be located at the side surface of the battery case 300.

Also, in the cylindrical secondary battery having the multilayer battery case according to the present invention, the welding portion 330 may be located at the upper surface of the battery case 300.

Also, in the cylindrical secondary battery having the multilayer battery case according to the present invention, the welding portion 330 may be located at two or more of the lower surface, the side surface, and the upper surface of the battery case 300.

A method of manufacturing a cylindrical secondary battery having a multilayer battery case according to the present invention includes a step of overlapping a copper sheet and a nickel or nickel-plated steel sheet to prepare a stacked-layer sheet; a step of welding only a predetermined region of the stacked-layer sheet to form a welding portion; a step of deep-drawing the stacked-layer sheet to prepare a cylindrical battery case configured such that the lower surface and the side surface of the cylindrical battery case are bent at a predetermined angle and such that the upper part of the cylindrical battery case is open; a step of receiving an electrode assembly and a cap assembly in the cylindrical battery case; and a step of fixing the upper part of the cylindrical battery case.

Also, in the method of manufacturing the cylindrical secondary battery having the multilayer battery case according to the present invention, the welding may be ultrasonic welding.

Also, in the method of manufacturing the cylindrical secondary battery having the multilayer battery case according to the present invention, the welding portion 330 may be formed so as to have the shape of a circular band.

Also, in the method of manufacturing the cylindrical secondary battery having the multilayer battery case according to the present invention, the circular band may include two or more circular bands having different inner diameters on the basis of an imaginary identical central point.

BEST MODE

In the present application, it should be understood that the terms "comprises," "has," or "includes," etc. specify the presence of features, integers, steps, operations, components, parts, or combinations thereof described in the specification, but do not preclude the presence or addition of one or more other features, integers, steps, operations, components, parts, or combinations thereof.

In addition, the same reference numerals will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that the other elements may be further included unless mentioned otherwise.

Hereinafter, a cylindrical secondary battery having a multilayer battery case according to the present invention and a method of manufacturing the same will be described with reference to the accompanying drawings.

Figure 1:
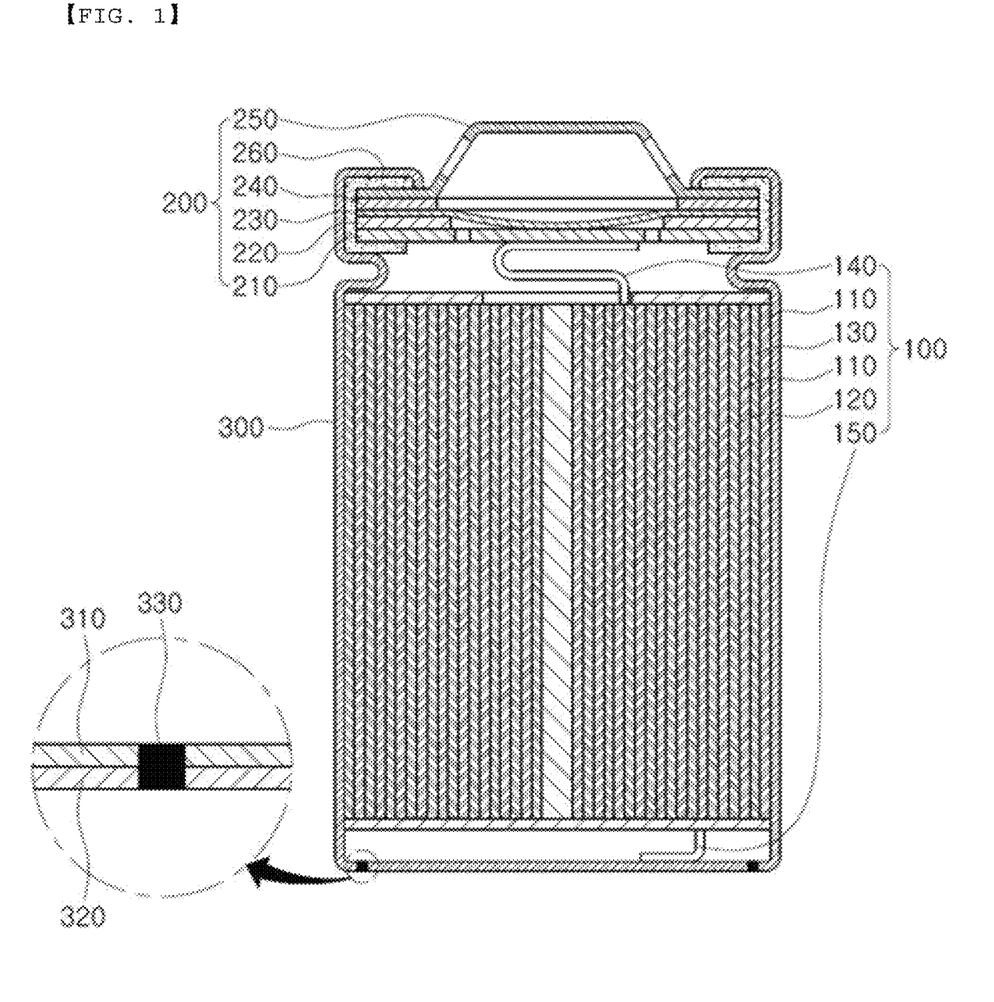
FIG. 1 is a sectional view of a cylindrical secondary battery having a multilayer battery case according to a first preferred embodiment of the present invention.

FIG. 1 is a sectional view of a cylindrical secondary battery having a multilayer battery case according to a first preferred embodiment of the present invention.

Referring to FIG. 1, the cylindrical secondary battery having the multilayer battery case according to the first embodiment of the present invention includes an electrode assembly 100, a cap assembly 200, and a cylindrical battery case 300 configured to receive the same.

The electrode assembly 100 may be a jelly-roll type electrode assembly configured to have a structure in which a long-sheet type positive electrode 110 and a long-sheet type negative electrode 120 are wound in the state in which a separator 130 is interposed therebetween, a stacked type electrode assembly including unit cells, each of which is configured to have a structure in which a rectangular positive electrode 110 and a rectangular negative electrode 120 are stacked in the state in which a separator 130 is interposed therebetween, a stacked and folded type electrode assembly configured to have a structure in which the unit cells are wound using a long separation film, or a laminated and stacked type electrode assembly configured to have a structure in which the unit cells are stacked in the state in which a separator is interposed therebetween and are then attached to each other.

A positive electrode tab 140 attached to the upper end of the electrode assembly 100 is electrically connected to the cap assembly 200, and a negative electrode tab 150 attached to the lower end of the electrode assembly 100 is connected to the bottom of the battery case 300.

Here, the negative electrode tab 150 is preferably made of a copper material that has low resistance and high maximum allowable current.

Meanwhile, an insulating member (not shown) may be located at the upper part of the electrode assembly 100, and the insulating member (not shown) serves to insulate the electrode assembly 100 and the cap assembly 200 from each other.

The cap assembly 200 is located at the upper part of the insulating member (not shown) so as to be electrically connected to the positive electrode tab 140 attached to the upper end of the electrode assembly 100, and is coupled to the upper open end of the battery case 300 so as to seal the electrode assembly 100 received in the battery case 300.

Specifically, the cap assembly 200 is configured such that a current interrupt device 210, a current interrupt gasket 220, a safety vent 230, a PTC element 240, and a top cap 250 are sequentially stacked from below, and a crimping gasket 260 is located at the outer edges of the current interrupt device 210 and the top cap 250.

The positive electrode tab 140 is connected to the current interrupt device 210 at a predetermined position of the lower surface thereof. Although the current interrupt device 210 is shown as being flat in the figure, the central part of the current interrupt device may be convex upwards.

The safety vent 230, which is formed such that the central part of the safety vent protrudes downwards, is located at the upper part of the current interrupt device 210. The safety vent 230 interrupts current and discharges gas in the case in which the pressure in the battery increases, and is disposed such that one surface of the safety vent contacts the PTC element 240 and the end surface of the edge of the safety vent contacts the crimping gasket 260.

The current interrupt gasket 220 is located such that the state in which the current interrupt device 210 and the safety vent 230 are electrically insulated from each other can be maintained, except for downwardly protruding portions of the current interrupt device 210 and the safety vent 230.

One surface of the edge of the positive temperature coefficient (PTC) element 240, the resistance of which increases to interrupt current when the temperature in the battery increases, abuts the safety vent 230, and the other surface the edge of the PTC element abuts the inner surface of the edge of the top cap 250.

For a cylindrical secondary battery, gas is generated in the battery due to various causes, such as external impact, whereby the pressure in the battery increases, and therefore the battery may catch fire or explode.

The current interrupt device 210 and the safety vent 230 are provided in order to easily guide the discharge of gas acting as a cause of increasing the pressure in the battery, when the pressure in the battery reaches a predetermined pressure or higher, predetermined portions of the current interrupt device 210 and the safety vent 230 are broken to prevent explosion of the battery.

The top cap 250, which is located at the uppermost part, seals the upper open end of the battery case 300, and forms a positive electrode terminal.

In a general cylindrical secondary battery, a crimping process and a beading process are performed in order to fix the cap assembly 200.

The crimping gasket 260 is attached to the edges, i.e. the outer circumferential surfaces, of the current interrupt device 210, the safety vent 230, the PTC element 240, and the top cap 250 in order to prevent the above unit components from being deformed or damaged at the time of performing the crimping process and the beading process and to improve tight contact between the current interrupt device 210 and the top cap 250. Here, the material for the crimping gasket 260 is not particularly restricted as long as the material exhibits predetermined elasticity and durability, and may be, as an example, poly butylene terephthalate (PBT), polyphenylene sulfide (PPS), or perfluoroalkoxy (PFA).

The battery case 300 receives the electrode assembly 100 and the cap assembly 200 therein, and the negative electrode tab 150 extends downwards and is then connected to the bottom of the battery case 300 such that the bottom of the main body of the battery case 300 acts as a negative electrode.

Here, the battery case 300 has a multilayer structure including an inner layer 310 and an outer layer 320. Specifically, the inner layer 310 is connected so as to directly contact the negative electrode tab 150, and the outer layer 320 is located outside the inner layer 310.

The outer layer 320 is preferably made of a material that exhibits lower thermal conductivity than the inner layer 310. As an example, the inner layer 310 may be a sheet made of a copper material, and the outer layer 320 may be a nickel or nickel-plated steel sheet.

A circular-band-shaped welding portion 330 is formed at the edge of the bottom surface of the battery case 300 in order to fix the inner layer 310 and the outer layer 320 to each other such that the layers are securely electrically connected to each other.

That is, in the battery case 300 according to the first embodiment of the present invention, the inner layer 310 and the outer layer 320 are adhered and fixed to each other via only the welding portion 330 formed by ultrasonic welding.

Therefore, the present invention has advantages in that, when the negative electrode tab 150 made of the copper material is adopted, the maximum allowable current and heat dissipation characteristics thereof are excellent, whereby it is possible to provide a high-output battery, the negative electrode tab 150 and the inner layer 310 have the same melting point, since the negative electrode tab 150 and the inner layer 310 are made of the same kind of metal, i.e. copper, whereby it is possible to easily fix the negative electrode tab 150 to the inner layer 310 by resistance welding, and it is not necessary to use a copper-nickel clad, which is expensive.

Figure 2:
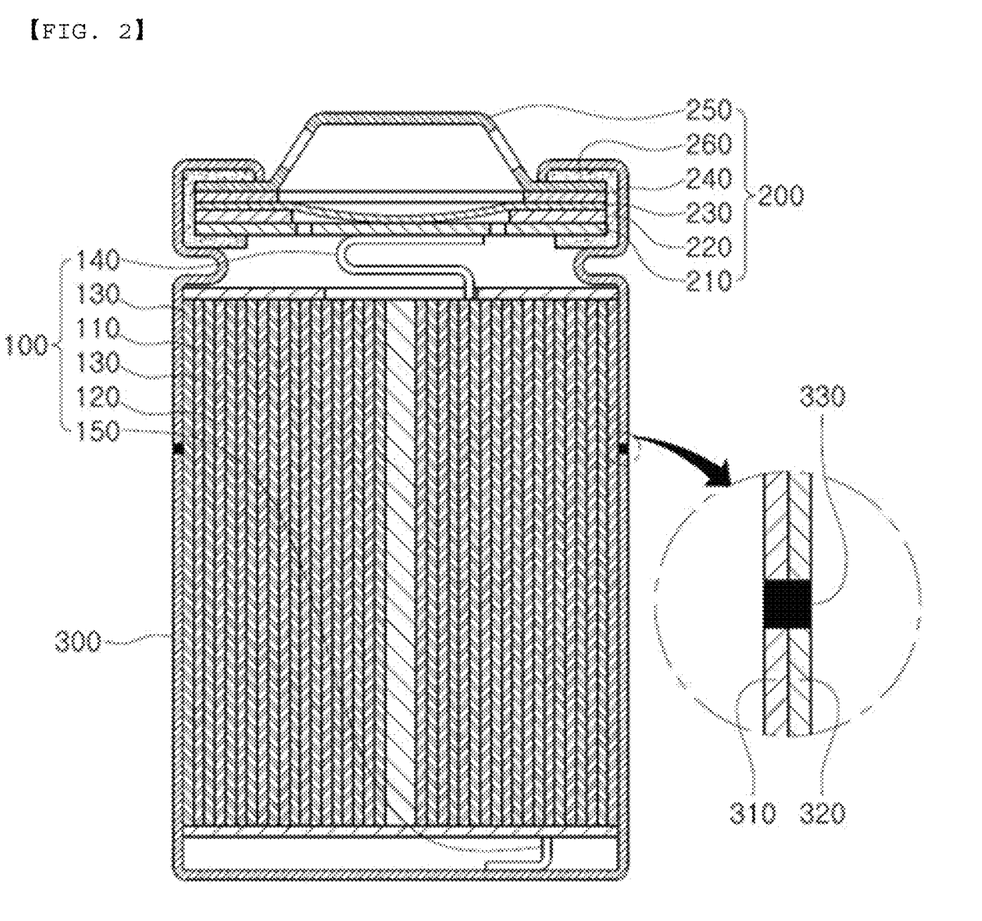
FIG. 2 is a sectional view of a cylindrical secondary battery having a multilayer battery case according to a second preferred embodiment of the present invention.

FIG. 2 is a sectional view of a cylindrical secondary battery having a multilayer battery case according to a second preferred embodiment of the present invention. This embodiment is different from the first embodiment of FIG. 1 in connection with the position of the welding portion 330. That is, in the second embodiment, the welding portion 330 may be located at a predetermined region of the side surface of the battery case 300, rather than the edge of the bottom surface of the battery case.

Figure 3:
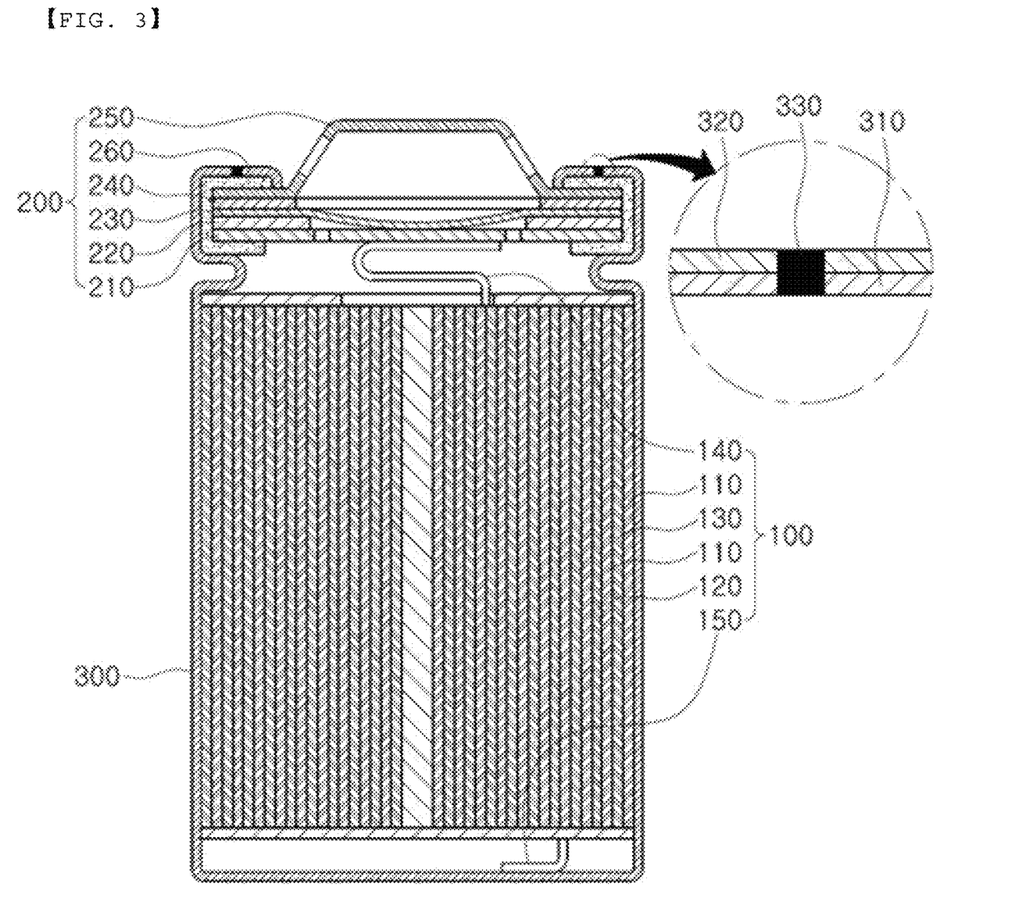
FIG. 3 is a sectional view of a cylindrical secondary battery having a multilayer battery case according to a third preferred embodiment of the present invention.

FIG. 3 is a sectional view of a cylindrical secondary battery having a multilayer battery case according to a third preferred embodiment of the present invention. This embodiment is different from the first embodiment of FIG. 1 in connection with the position of the welding portion 330. That is, in the third embodiment, the welding portion 330 may be located at a predetermined region of the upper surface of the battery case 300, rather than the edge of the bottom surface of the battery case.

Figure 4:
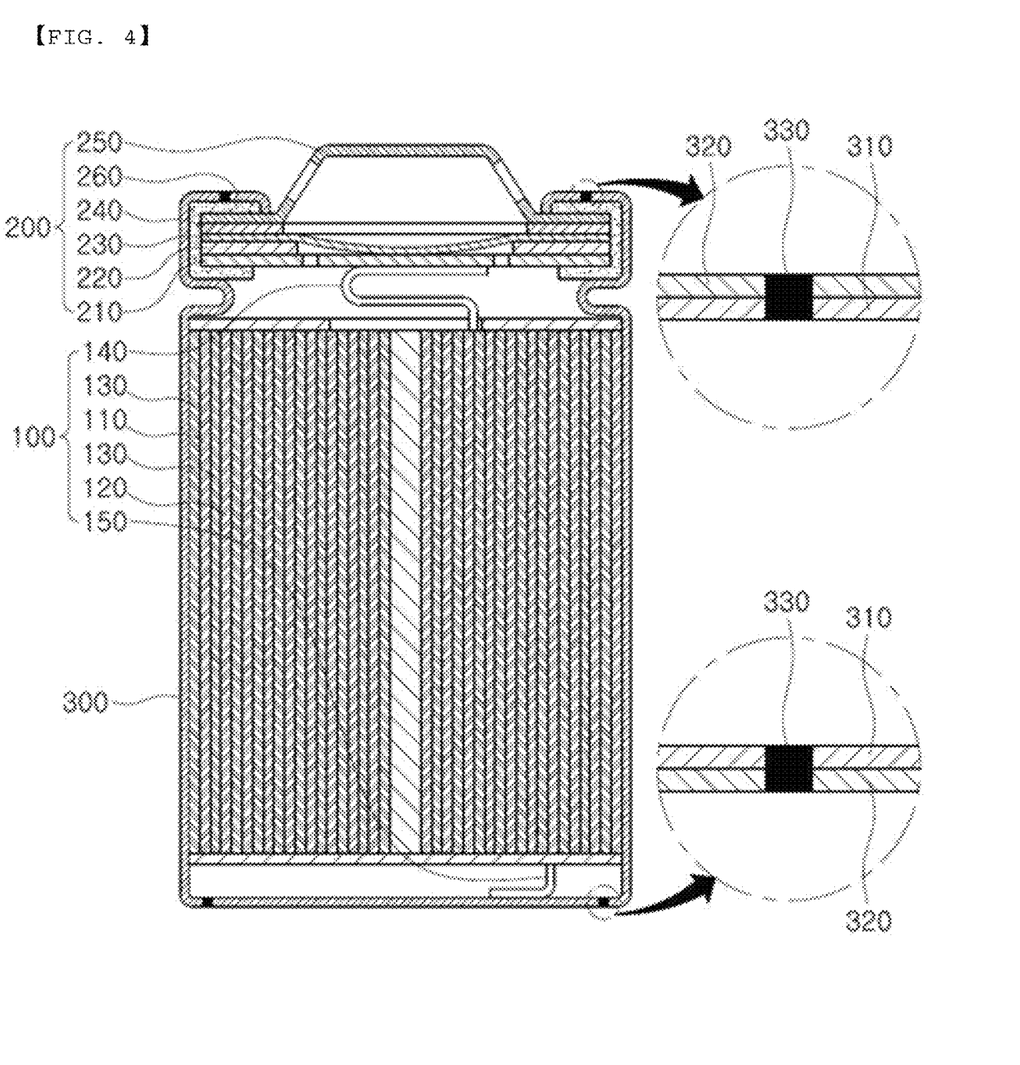
FIG. 4 is a sectional view of a cylindrical secondary battery having a multilayer battery case according to a fourth preferred embodiment of the present invention.

FIG. 4 is a sectional view of a cylindrical secondary battery having a multilayer battery case according to a fourth preferred embodiment of the present invention. Although the welding portion 330 is located at the edge of the bottom surface of the battery case in the first embodiment of FIG. 1, the welding portion 330 may be further formed at a predetermined region of the upper surface of the battery case 300 in the fourth embodiment.

Of course, although not shown in the figures, welding portions 330 may be formed at the edge of the bottom surface of the battery case 300 and the side surface of the battery case, the side surface and the upper surface of the battery case 300, or the edge of the bottom surface of the battery case 300 and the side surface and the upper surface of the battery case.

Next, a method of welding a multilayer sheet for battery cases will be described with reference to FIGS. 5 and 6.

Figure 5:
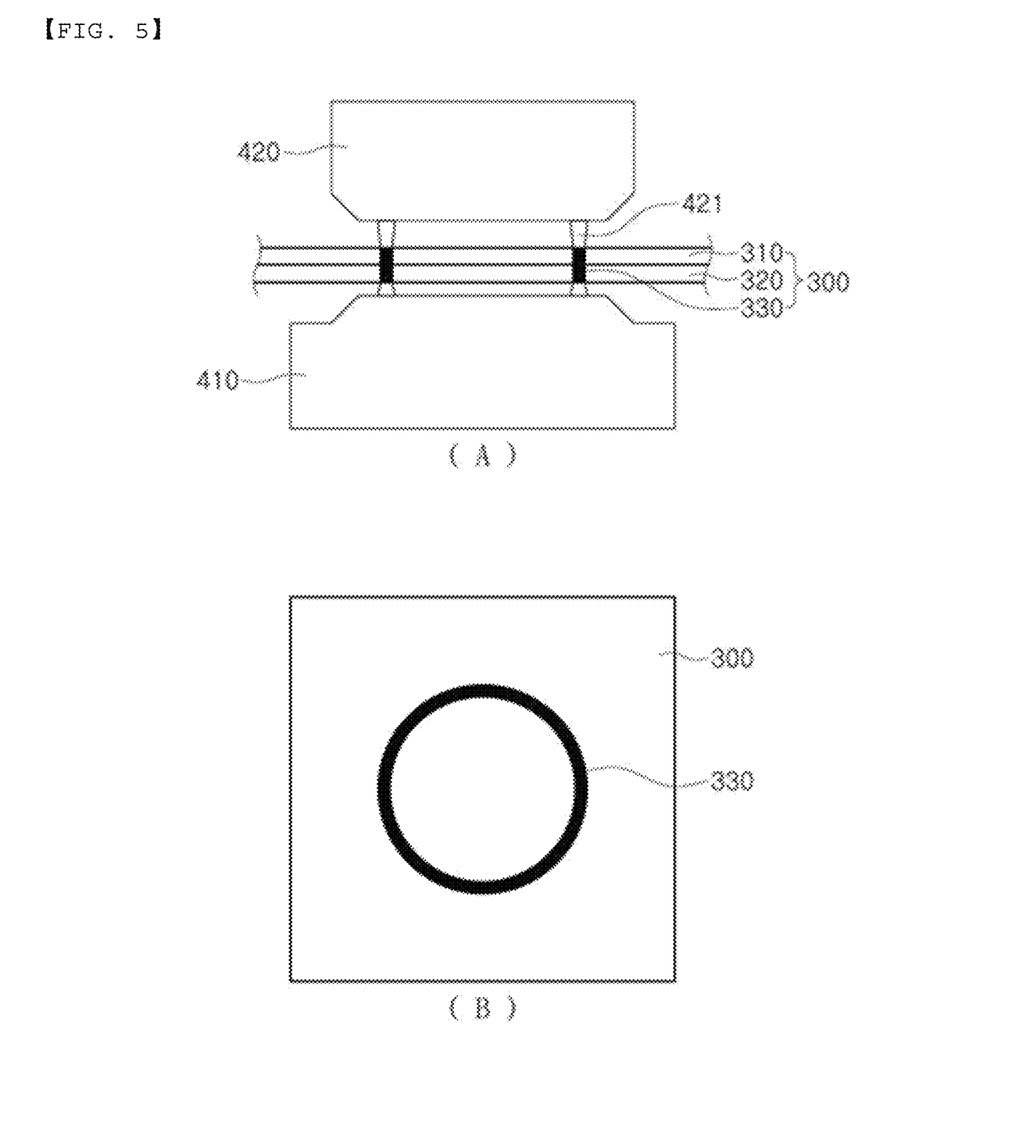
FIG. 5 is a conceptual view illustrating a method of welding a multilayer sheet for battery cases applied to the first embodiment of the present invention.

FIG. 5 is a conceptual view illustrating a method of welding a multilayer sheet for battery cases applied to the first embodiment of the present invention, wherein FIG. 5(A) is a sectional view showing the state in which a multilayer sheet is seated in an ultrasonic welding apparatus. Specifically, an inner layer 310 and an outer layer 320 each having a predetermined width and length are placed above a die 410 in an overlapping state, and an ultrasonic horn 420 is located thereabove.

When an ultrasonic wave having a predetermined range is applied through tips 421 together with pressing, the temperature of corresponding regions of the inner layer 310 and the outer layer 320 is increased by vibration-based frictional heat, whereby the regions of the inner layer and the outer layer are joined to each other. Such an ultrasonic welding principle is well known, and therefore a detailed description thereof will be omitted.

FIG. 5(B) is a view of the multilayer sheet when viewed from above, which is a view showing the position and shape of a welding portion 330 formed by ultrasonic joining. That is, when welding is performed while rotating the ultrasonic horn 420 or the stacked-layer sheet including the inner layer 310 and the outer layer 320, a circular-band-shaped welding portion 330 having a predetermined inner diameter is formed, whereby the inner layer 310 and the outer layer 320 are welded to each other.

Figure 6:
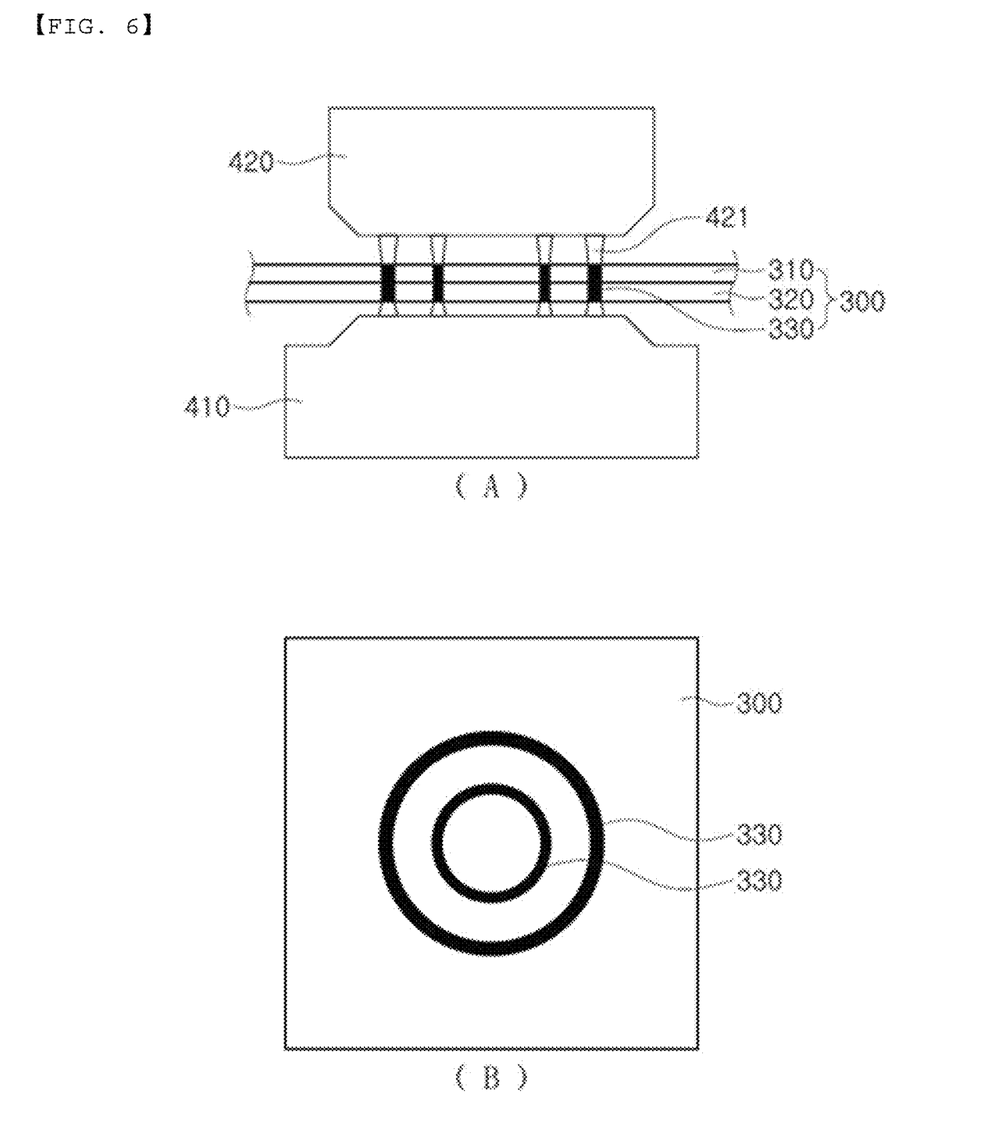
FIG. 6 is a conceptual view illustrating a method of welding a multilayer sheet for battery cases applied to the fourth embodiment of the present invention.

FIG. 6 is a conceptual view illustrating a method of welding a multilayer sheet for battery cases applied to the fourth embodiment of the present invention. Welding is performed using an ultrasonic horn 420 having four tips 421 spaced apart from each other by a predetermined distance (see FIG. 6(A)), and when welding is performed while rotating the ultrasonic horn 420 or the stacked-layer sheet, it is possible to form two circular-band-shaped welding portions 330 having different inner diameters on the basis of an imaginary identical central point (see FIG. 6(B)).

Of course, it is possible to form a plurality of welding portions having predetermined shapes using an ultrasonic horn 420 having a single tip 421 while rotating the stacked-layer sheet or the ultrasonic horn 420, and it is also possible to form a welding portion 330 having any of various shapes, rather than a circular band shape.

Figure 7:
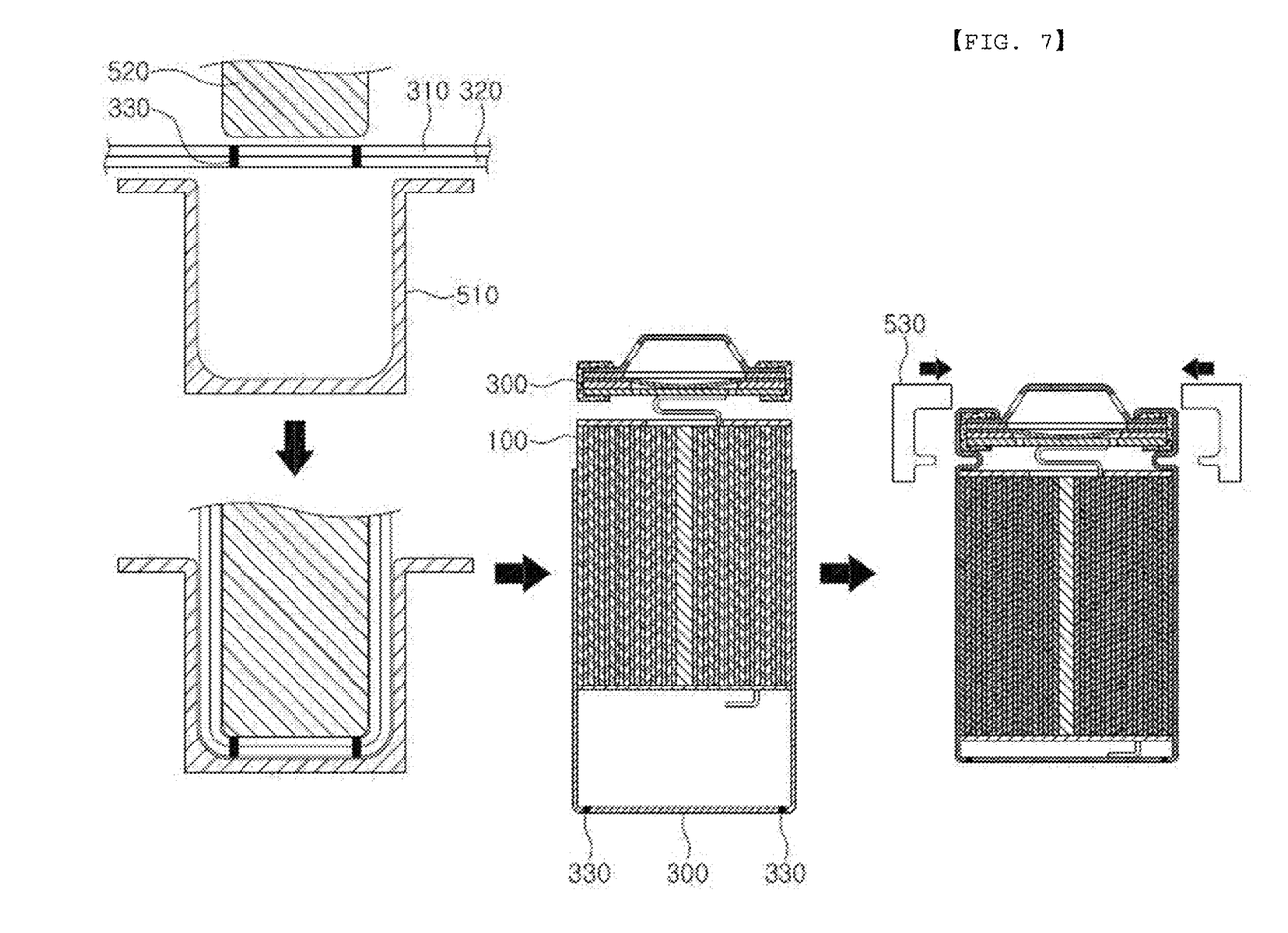
FIG. 7 is a conceptual view illustrating a process of manufacturing the cylindrical secondary battery having the multilayer battery case according to the first preferred embodiment of the present invention.

Subsequently, a method of manufacturing a cylindrical secondary battery having a multilayer battery case according to the present invention will be described. FIG. 7 is a conceptual view illustrating a process of manufacturing the cylindrical secondary battery having the multilayer battery case according to the first preferred embodiment of the present invention.

The method of manufacturing the cylindrical secondary battery according to the present invention includes a step of preparing a stacked-layer sheet, a step of welding only a predetermined region of the stacked-layer sheet, a step of deep-drawing the welded stacked-layer sheet to prepare a cylindrical battery case having an open upper part, a step of receiving an electrode assembly and a cap assembly in the cylindrical battery case, and a step of fixing the upper part of the cylindrical battery case.

The steps of preparing a stacked-layer sheet and welding only a predetermined region of the stacked-layer sheet have been described with reference to FIG. 5, and therefore a further description thereof will be omitted.

In the step of preparing a cylindrical battery case, the stacked-layer sheet having a welding portion 330 formed thereat is placed at the upper part of a mold 510 having a predetermined inner diameter and height, the stacked-layer sheet is pressed using a punch 520 from above the stacked-layer sheet, i.e. the stacked-layer sheet is deep-drawn, in order to form the stacked-layer sheet such that the upper part of the stacked-layer sheet is open while the lower surface and the side surface of the stacked-layer sheet are bent at a predetermined angle.

Here, the welding portion 330 is located in the vertical surface of the mold 510 such that the welding portion 330 is located at the edge of the bottom surface of the cylindrical battery case. It is obvious that, in the case in which the battery case according to the second embodiment is formed, the welding portion 330 of the stacked-layer sheet must be larger than the bottom surface of the mold 510 and the welding portion 330 must be located so as to wrap the bottom surface of the mold 510.

An electrode assembly 100 and a cap assembly 200 are sequentially received in the battery case prepared as described above through the upper end opening thereof, and then a jig 530 is pushed to perform a crimping process and a beading process.

Of course, it is reasonable to further perform a resistance welding process in order to connect a negative electrode tab 150 made of a copper material to an inner layer 310 of the battery case 300 made of the same material.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Electrode assembly
110: Positive electrode 120: Negative electrode
130: Separator 140: Positive electrode tab
150: Negative electrode tab
200: Cap assembly
210: Current interrupt device 220: Current interrupt gasket
230: Safety vent 240: PTC element
250: Top cap 260: Crimping gasket
300: Battery case
310: Inner layer 320: Outer layer
330: Welding portion
410: Die 420: Ultrasonic horn
421: Tip
510: Mold 520: Punch
530: Jig

INDUSTRIAL APPLICABILITY

In a cylindrical secondary battery having a multilayer battery case according to the present invention, both a negative electrode tab and an inner layer of the battery case are made of the same kind of material, such as a copper material, whereby it is possible to secure reliability in welding and thus to contribute to a reduction in defect rate of products.

Also, in the cylindrical secondary battery having the multilayer battery case according to the present invention, both the negative electrode tab and the inner layer of the battery case are made of a copper material that exhibits excellent maximum allowable current and heat dissipation characteristics, whereby it is possible to improve heat diffusion and thus to provide a high-output secondary battery.

Furthermore, in the cylindrical secondary battery having the multilayer battery case according to the present invention, only a predetermined region of a multilayer sheet made of a copper material and a nickel material, which are different kinds of metals, is ultrasonically welded so as to be used as a sheet for battery cases without using a copper-nickel clad, which is expensive, whereby it is possible to reduce manufacturing costs.

The invention claimed is:

1. A secondary battery having a multilayer battery case, the secondary battery comprising:
    an electrode assembly comprising a positive electrode, a negative electrode, a separator interposed between the positive electrode and the negative electrode, a positive electrode tab having one side connected to the positive electrode, and a negative electrode tab having one side connected to the negative electrode;
    a cap assembly comprising a current interrupt device configured to interrupt current when pressure in the secondary battery increases, the current interrupt device being located at an upper part of the electrode assembly, a safety vent connected to an upper end of the current interrupt device, and a top cap formed in an upwardly protruding shape, a lower surface of an outer circumferential surface of the top cap being in contact with an upper surface of an outer circumferential surface of the safety vent; and
    a battery case configured to receive the electrode assembly and the cap assembly therein,
    wherein the battery case comprises an inner layer disposed adjacent to the electrode assembly and an outer layer made of a material that exhibits lower thermal conductivity than the inner layer, the inner layer and the outer layer being provided with a welding portion, at which only the predetermined regions of the inner layer and the outer layer are fixed by welding, and
    wherein the inner layer of the battery case and the negative electrode tab of the electrode assembly directly contact each other and are made of a same material.

2. The secondary battery according to claim 1, wherein the inner layer and the negative electrode tab are made of copper, and wherein the outer layer is a nickel or nickel-plated steel sheet.

3. The secondary battery according to claim 1, wherein the welding portion is formed by ultrasonic welding.

4. The secondary battery according to claim 3, wherein the welding portion is located at a lower surface of the battery case.

5. The secondary battery according to claim 4, wherein the welding portion is formed in a circular band shape smaller than an inner diameter of the battery case.

6. The secondary battery according to claim 3, wherein the welding portion is located at a side surface of the battery case.

7. The secondary battery according to claim 3, wherein the welding portion is located at an upper surface of the battery case.

8. The secondary battery according to claim 3, wherein the welding portion is located at two or more of a lower surface, a side surface, and an upper surface of the battery case.

9. The secondary battery according to claim 1, wherein the secondary battery is a cylindrical secondary battery, the electrode assembly is a jelly-roll electrode assembly, and the battery case is a cylindrical metal can.

* * * * *